US011990104B2

(12) United States Patent
Hatakenaka et al.

(10) Patent No.: US 11,990,104 B2
(45) Date of Patent: *May 21, 2024

(54) INPUT SIGNAL CORRECTION DEVICE (71) Applicant: IIX INC., Tokyo (JP)

(72) Inventors: Makoto Hatakenaka, Tokyo (JP);
Takashi Sakamoto, Tokyo (JP);
Yoshihide Minegishi, Tokyo (JP);
Ryohei Hatta, Tokyo (JP); Norimasa
Senda, Tokyo (JP)

(73) Assignee: IIX INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/028,370

(22) PCT Filed: Feb. 25, 2021

(86) PCT No.: PCT/JP2021/007041
§ 371 (c)(1),
(2) Date: Mar. 24, 2023

(87) PCT Pub. No.: WO2022/064732
PCT Pub. Date: Mar. 31, 2022

(65) Prior Publication Data
US 2023/0395038 A1     Dec. 7, 2023

(30) Foreign Application Priority Data
Sep. 28, 2020   (JP) .............................. 2020-162201

(51) Int. Cl.
G09G 5/04         (2006.01)
(52) U.S. Cl.
CPC ....... G09G 5/04 (2013.01); G09G 2300/0452 (2013.01); G09G 2330/08 (2013.01); G09G 2330/10 (2013.01)

(58) Field of Classification Search
CPC ............. G09G 5/04; G09G 2300/0452; G09G 2310/08; G09G 2330/10; G09G 3/2074;
(Continued)

(56) References Cited
U.S. PATENT DOCUMENTS 9,554,044 B2 *   1/2017   Imoto ..................... H04N 25/60
2003/0128179 A1 *  7/2003  Credelle .............. G09G 3/3607
                                                        345/88

(Continued)

FOREIGN PATENT DOCUMENTS

JP      2007-094338 A      4/2007
JP      2007-199683 A      8/2007

(Continued)

OTHER PUBLICATIONS

Apr. 27, 2021 Search Report issued in International Patent Application No. PCT/JP2021/007041.

(Continued)

Primary Examiner — Michael Pervan
(74) Attorney, Agent, or Firm — Oliff PLC (57) ABSTRACT An input signal correction device for reducing power consumption is compatible with a variety of display panels, and includes an input circuit, extension/degeneration circuit, separation/recovery circuit and delay adjustment circuit operating at frequency f, demura circuit operating at frequency f/2, and adder circuit. The extension/degeneration circuit outputs a preprocessing signal increasing the input signal cycle length by 2 or outputs by degenerating the input signal to ½, based on a control signal, the demura circuit outputs a correction signal correcting the preprocessing signal from the extension/degeneration circuit, the separation/recovery circuit outputs a differential signal reducing the correction signal cycle length to ½ or reduces cycle length to ½ and outputs the same differential signal over two (Continued)

cycles, based on a control signal, the delay adjustment circuit outputs a delay signal delaying the input signal, and the adder circuit outputs a signal adding the differential signal to the delay signal.

8 Claims, 10 Drawing Sheets

(58) Field of Classification Search
CPC .. G09G 2330/021; G09G 3/20; G09G 3/3233; G09G 5/00; G09G 5/36; G09G 5/391; G09G 2330/08
See application file for complete search history.

(56) References Cited

U.S. PATENT DOCUMENTS

| | | | | |
|---|---|---|---|---|
| 2006/0092329 A1* | 5/2006 | Noji | ..................... | H04N 9/31 |
| | | | | 348/E9.053 |
| 2007/0252782 A1 | 11/2007 | Yui | | |
| 2013/0257915 A1 | 10/2013 | Yang et al. | | |
| 2015/0271409 A1* | 9/2015 | Imoto | ..................... | H04N 25/71 |
| | | | | 345/589 |

FOREIGN PATENT DOCUMENTS

| | | | |
|---|---|---|---|
| JP | 4647213 | B2 | 3/2011 |
| JP | 6220674 | B2 | 10/2017 |
| WO | 2018/016745 | A1 | 1/2018 |

OTHER PUBLICATIONS

Apr. 27, 2021 Written Opinion of the International Searching Authority issued in International Patent Application No. PCT/JP2021/007041.

Mar. 12, 2024 Office Action issued in Japanese Patent Application No. 2020-162201.

* cited by examiner

| R:G:B RATIO | 2:1:1 (RGRB) | 1:2:1 (RBGB) | 1:1:2 (RGBG) | 2:1:2 (RRBGG) | 1:1:1 (RGB) |
|---|---|---|---|---|---|
| SEL_R | 1 | 0 | 0 | 1 | 1 |
| SEL_B | 0 | 1 | 0 | 0 | 1 |
| SEL_G | 0 | 0 | 1 | 1 | 1 |

INPUT SIGNAL CORRECTION DEVICE

TECHNICAL FIELD

The present invention relates to an input signal correction device for correcting input signals for a display panel having R, G and B subpixels.

BACKGROUND ART

Conventionally, as described in Patent Document 1, LCD, OLED, micro LED and other display panels having unequal numbers of R, G and B subpixels, also called a PenTile (registered trademark) structure, are known. Display panels having such a structure are able to secure a resolution with a small number of subpixels, and have recently been widely employed in smartphone displays and other devices.

Figure 9:
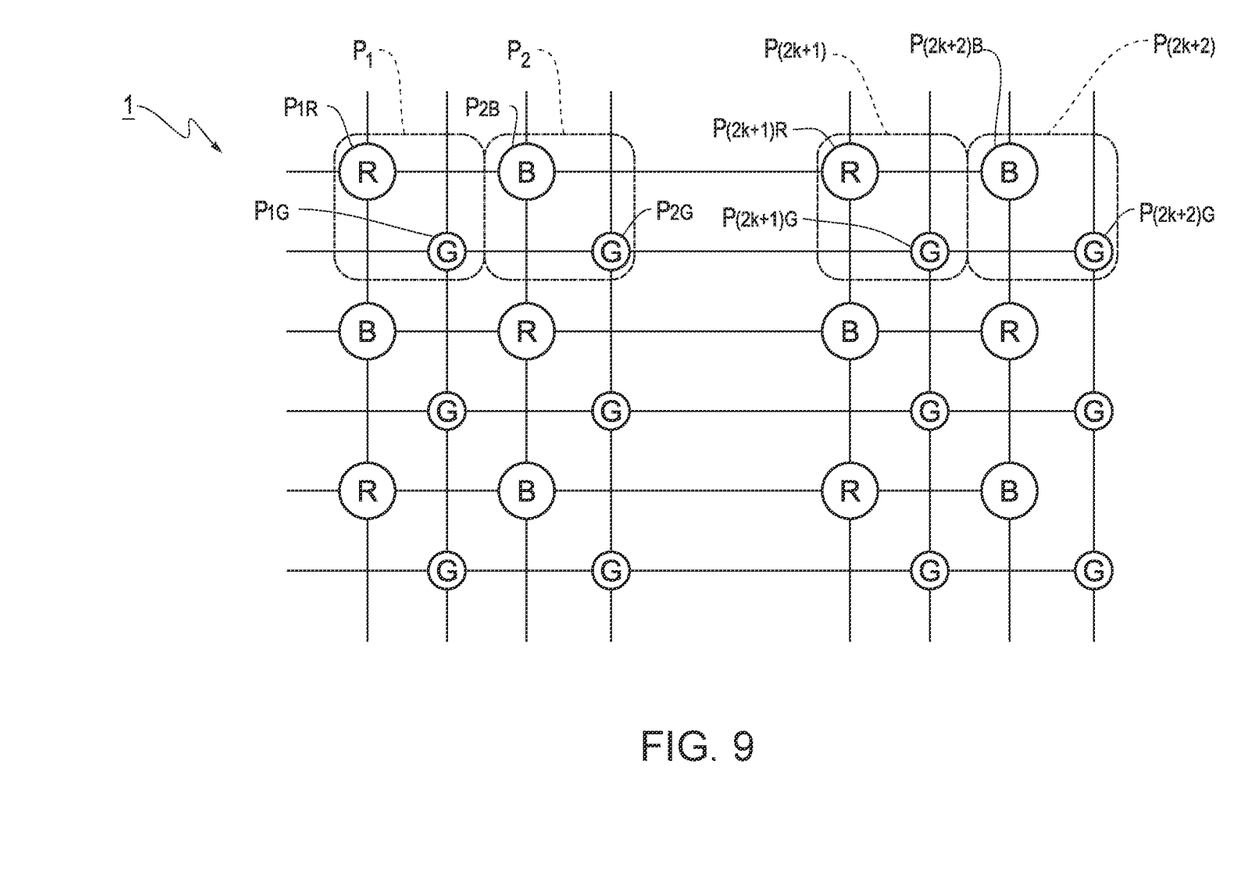
FIG. 9 is an illustrative diagram showing a panel body of a display panel having an RGBG pixel structure.
Figure 10:
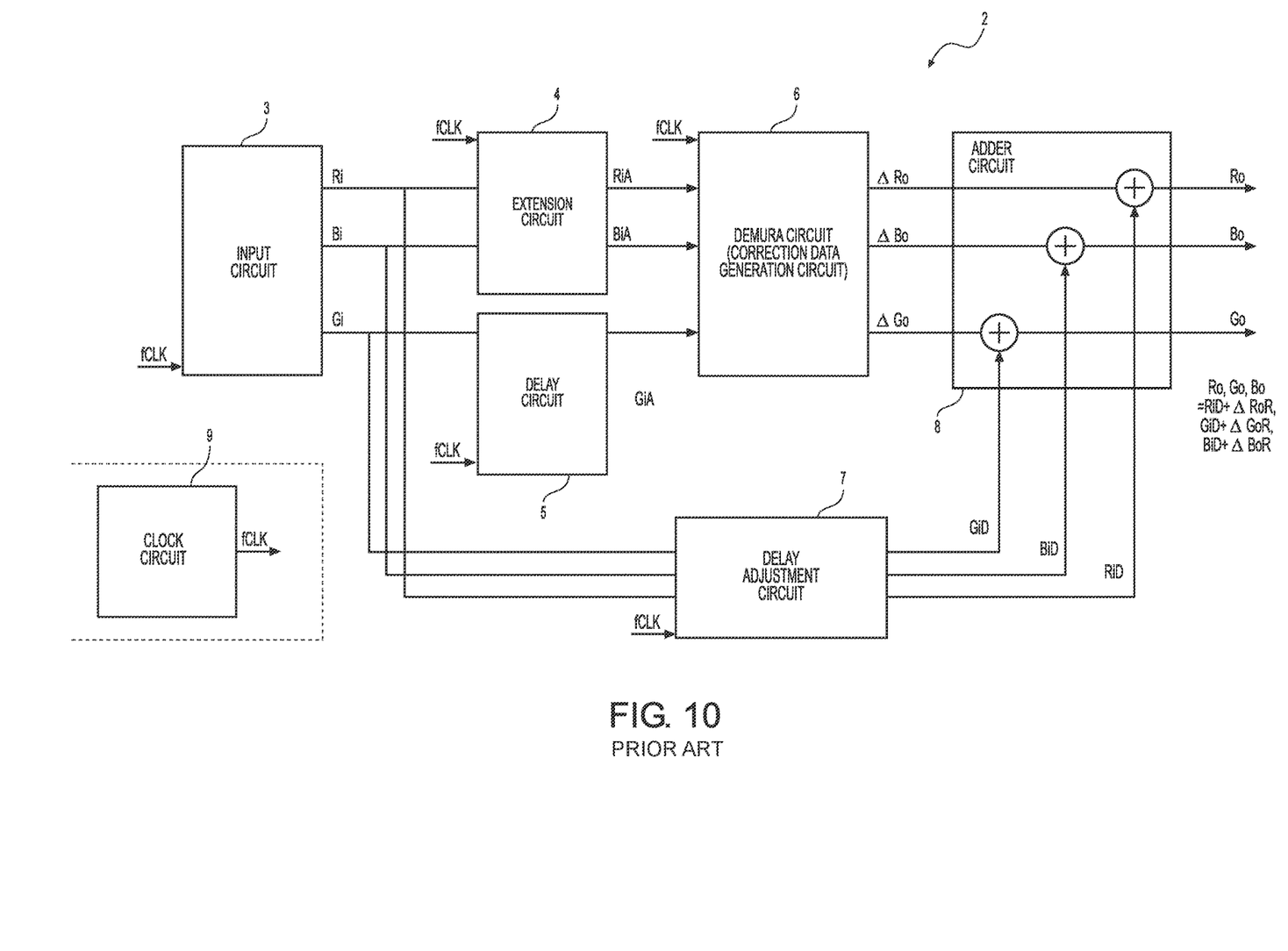
FIG. 10 is a block diagram showing a conventional input signal correction device.

As shown in FIG. 9, in a display panel 1 having an RGBG pixel structure, a 1st pixel $P_1$ includes an R subpixel $P_{1R}$ and a G subpixel $P_{1G}$, a 2nd pixel $P_2$ includes a B subpixel $P_{2B}$ and a G subpixel $P_{2G}$, a (2 k+1)th pixel $P_{(2k+1)}$ (where k is an integer greater than or equal to 1) includes an R subpixel $P_{(2k+1)R}$ and a G subpixel $P_{(2k+1)G}$, and a (2 k+2)th pixel $P_{(2k+2)}$ includes an B subpixel $P_{(2k+2)B}$ and a G subpixel $P_{(2k+2)G}$. This display panel 1 may have an input signal correction device 2 such as shown in FIG. 10, so that even if the panel body of the display panel 1 is structurally susceptible to mura defects, input image signals are corrected with software to remove (reduce) mura defects (hereinafter, this process will be referred to as "de-mura" or "demura") before being output to the panel body.

The input signal correction device 2 includes an input circuit 3 configured to operate at operating frequency f and to receive input of R, G and B input signals (image signals), an extension circuit 4 configured to operate at operating frequency f and to output preprocessing signals RiA and BiA by extending the cycle length of an input signal Ri relating to R subpixels and an input signal Bi relating to B subpixels, out of the R, G and B input signals input to the input circuit 3, by a factor of 2, a delay circuit 5 configured to operate at operating frequency f and to output a preprocessing signal GiA at approximately the same time as output of the preprocessing signals RiA and BiA by the extension circuit 4 by delaying an input signal Gi relating to G subpixels, out of the R, G and B input signals input to the input circuit 3, a demura circuit 6 configured to operate at operating frequency f and to output correction signals ΔRo, ΔBo and ΔGo by correcting the preprocessing signals RiA, BiA and GiA, a delay adjustment circuit 7 configured to operate at operating frequency f and to output delay signals RiD, BiD and GiD by delaying the input signals Ri, Bi and Gi, an adder circuit 8 configured to output output signals Ro, Bo and Go (Ro=RiD+ΔRo, Bo=BiD+ΔBo, Go=GiD+ΔGo) by respectively adding the correction signals ΔRo, ΔBo and ΔGo to the delay signals RiD, BiD and GiD, and a clock circuit 9 configured to generate a clock signal of operating frequency f to be input to the input circuit 3, the extension circuit 4, the delay circuit 5, the demura circuit 6 and the delay adjustment circuit 7. As described in Patent Document 2, mura defects of the panel body are corrected by inputting the output signals Ro, Bo and Go to the panel body rather than directly inputting the input signals Ri, Bi and Gi.

CITATION LIST

Patent Document

Patent Document 1: JP 4647213
Patent Document 2: JP 6220674

SUMMARY OF INVENTION

Technical Problem

Incidentally, in the past, the mura correction performance of the input signal correction device was important for technical competitiveness, but with the marked improvements in display panel performance in recent years, reduction in power consumption is now becoming the differentiating point. In particular, increases in the screen size and processor speed of mobile devices such as smartphones has meant that batteries are more easily drained, and reduction in power consumption relating to display panels has become an issue.

In view of this, the inventors of the present application invented an input signal correction device capable of reducing power consumption (JP 2020-052410), although this input signal correction device is for display panels having unequal numbers of R, G and B subpixels, and, moreover, the semiconductor circuit that applies this input signal correction device is only compatible with a specific panel model (e.g., RGBG display panels in which G is unequal), and is not compatible with other panel models (e.g., RBGB display panels in which B is unequal, GRBR display panels in which R is unequal, display panels in which RGB are equal), thus meaning that a semiconductor circuit has to be developed and manufactured for each display panel, which is costly.

The present invention has been made in view of the above circumstances, and an object thereof is to provide an input signal correction device capable of reducing power consumption and being compatible with a variety of display panels.

Solution to Problem

In order to solve the above problems, the present invention is an input signal correction device for correcting input signals for a display panel in which numbers of R, G and B subpixels are equal or unequal at a ratio of minority subpixels to majority subpixels of 1:N, where N is an integer of 2 or more, including an input circuit configured to operate at operating frequency f and, for each of the R, G and B subpixels, to receive input of an input signal, an extension/degeneration circuit configured to operate at operating frequency f and to receive input of a first control signal and, for each of the R, G and B subpixels, output a preprocessing signal by increasing a cycle length of the input signal by a factor of N or output a preprocessing signal by degenerating the input signal to 1/N, based on the first control signal, a correction circuit configured to operate at operating frequency f/N and, for each of the R, G and B subpixels, to output a correction signal by correcting the preprocessing signal, a separation/recovery circuit configured to operate at operating frequency f and to receive input of a second control signal and, for each of the R, G and B subpixels, output a differential signal by reducing the cycle length of the correction signal to 1/N or reduce the cycle length of the correction signal to 1/N and output a same differential signal over N cycles, based on the second control signal, a delay adjustment circuit configured to operate at operating frequency f and, for each of the R, G and B subpixels, to output a delay signal by delaying the input signal, and an adder circuit configured to, for each of the R, G and B subpixels, add the differential signal to the delay signal.

This input signal correction device may include a clock circuit configured to generate a clock signal of operating frequency f to be input to the input circuit, the extension/degeneration circuit, the separation/recovery circuit and the delay adjustment circuit, and a frequency divider circuit configured to generate a clock signal of operating frequency f/N to be input to the correction circuit, by dividing the frequency of the clock signal of operating frequency f.

Alternatively, the present invention is an input signal correction device for correcting input signals for a display panel in which numbers of R, G and B subpixels are equal or unequal at a ratio of minority subpixels to majority subpixels of 1:N, where N is an integer of 2 or more, including an input circuit configured to operate based on a clock signal of frequency f and, for each of the R, G and B subpixels, to receive input of an input signal, an extension/degeneration circuit configured to operate based on the clock signal and to receive input of a first control signal and, for each of the R, G and B subpixels, output a preprocessing signal by increasing a cycle length of the input signal by a factor of N or output a preprocessing signal by degenerating the input signal to 1/N, based on the first control signal, a correction circuit configured to operate based on the clock signal and to receive input of a clock enable signal for switching between enabling and disabling the clock signal at frequency f/N and, for each of the R, G and B subpixels, output a correction signal by correcting the preprocessing signal, a separation/recovery circuit configured to operate based on the clock signal and to receive input of a second control signal and, for each of the R, G and B subpixels, output a differential signal by reducing the cycle length of the correction signal to 1/N or reduce the cycle length of the correction signal to 1/N and output a same differential signal over N cycles, based on the second control signal, a delay adjustment circuit configured to operate based on the clock signal and, for each of the R, G and B subpixels, to output a delay signal by delaying the input signal, and an adder circuit configured to, for each of the R, G and B subpixels, add the differential signal to the delay signal.

This input signal correction device may include a clock circuit configured to generate the clock signal, and a clock enable circuit configured to generate the clock enable signal based on the clock signal.

Furthermore, the correction circuit may output the correction signal by correcting the preprocessing signal to reduce mura defects of the display panel.

Advantageous Effects of Invention

According to an input signal correction device of the present invention, power consumption can be reduced, and the input signal correction device is also compatible with a variety of display panels.

DESCRIPTION OF EMBODIMENTS

Embodiments of the invention will be described using the drawings.

Figure 1:
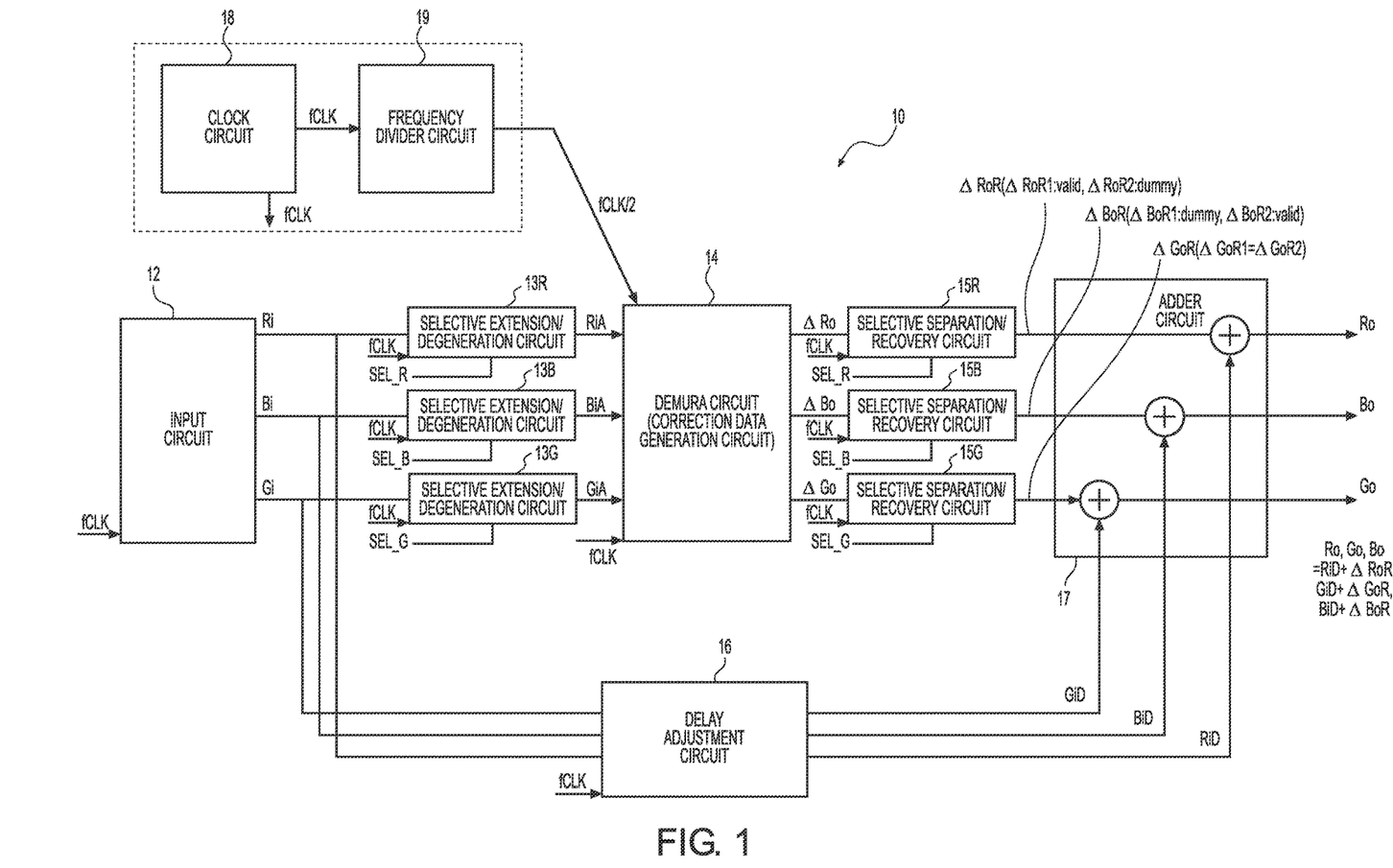
FIG. 1 is a block diagram showing an input signal correction device according to an embodiment of the invention.

FIG. 1 shows an input signal correction device according to the present embodiment. This input signal correction device 10 superposes a signal obtained by inverting the polarity of a mura signal acquired in advance on an input image signal and cancels mura defects of the panel body in a display panel 11 shown in FIG. 2 having an RGBG pixel structure similarly to the display panel 1 and in other display panels.

Figure 2:
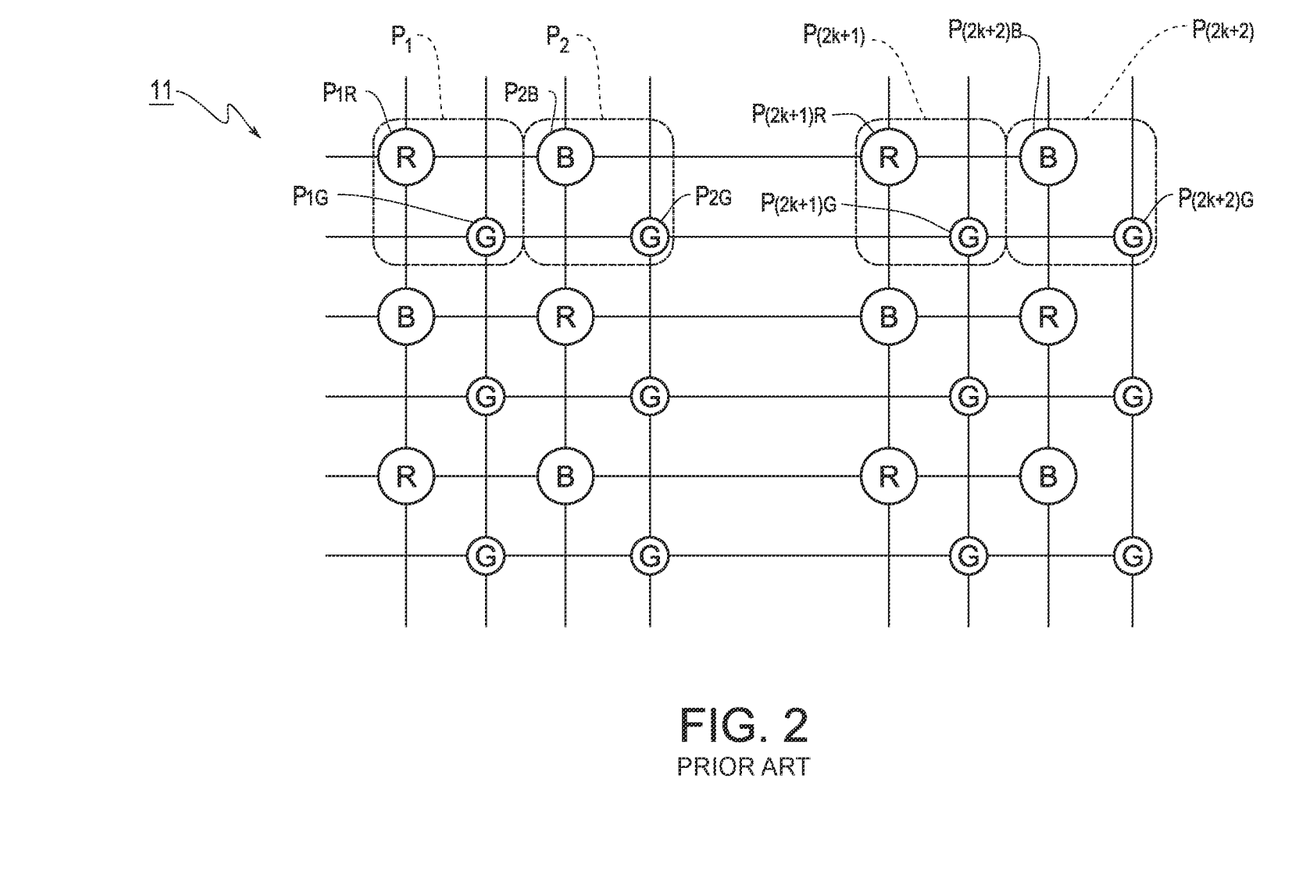
FIG. 2 is an illustrative diagram showing a panel body of a display panel to which the input signal correction device of FIG. 1 is applied.

In the panel body of the display panel 11, a pixel consisting of an R subpixel and a G subpixel and a pixel consisting of a B subpixel and a G subpixel are alternately arrayed horizontally and vertically. Specifically, a 1st pixel $P_1$ includes an R subpixel $P_{1R}$ and a G subpixel $P_{1G}$, a 2nd pixel $P_2$ includes a B subpixel $P_{2B}$ and a G subpixel $P_{2G}$, a (2 k+1)th pixel $P_{(2k+1)}$ includes an R subpixel $P_{(2k+1)R}$ and a G subpixel $P_{(2k+1)G}$, and a (2 k+2)th pixel $P_{(2k+2)}$ includes a B subpixel $P_{(2k+2)B}$ and a G subpixel $P_{(2k+2)G}$.

Also, the input signal correction device 10 includes an input circuit 12, extension/degeneration circuits 13R, 13B and 13G, a demura circuit 14, separation/recovery circuits 15R, 15B and 15G, a delay adjustment circuit 16, an adder circuit 17, a clock circuit 18, and a frequency divider circuit 19.

The input circuit 12 is configured to operate at operating frequency f and, when input signals (image signals) for the R, G and B subpixels are input, to respectively output these input signals to the extension/degeneration circuits 13R, 13B and 13G.

The extension/degeneration circuit 13R is configured to operate at operating frequency f and to receive input of a control signal SEL_R and, based on the control signal SEL_R, outputs a preprocessing signal RiA by extending the cycle length of an input signal Ri relating to R subpixels input from the input circuit 12 by a factor of 2 or output a preprocessing signal RiA by degenerating the input signal Ri to ½ ("degeneration" involves converting data of X pixel into data of Y pixel (Y<X) by deriving an arithmetic mean value, weighted mean value, central value, etc.).

Figure 3A:
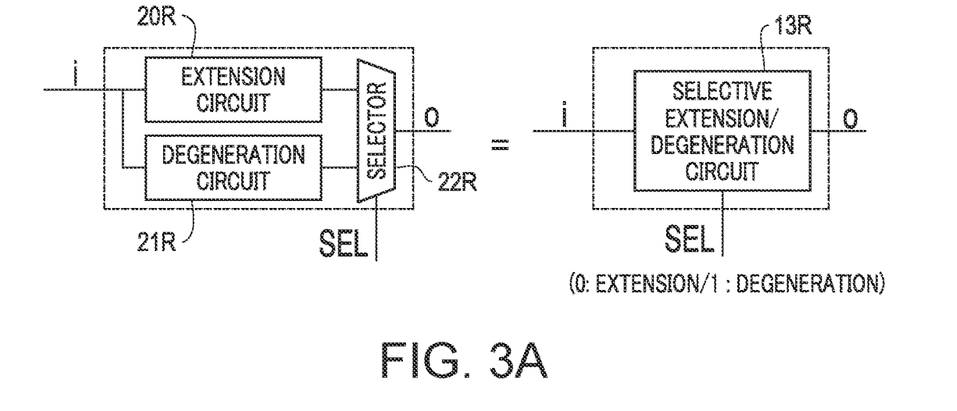
FIG. 3A is a block diagram showing the configuration of an extension/degeneration circuit for R subpixels.

In the extension/degeneration circuit 13R, as shown in FIG. 3A, an extension circuit 20R that outputs the preprocessing signal RiA by extending the cycle length of the input signal Ri by a factor of 2 and a degeneration circuit 21R that outputs the preprocessing signal RiA by degenerating the input signal Ri to ½ are connected to a selector 22R, and the extension circuit 20R is selected if the control signal SEL_R input to the selector 22R is "0", and the degeneration circuit 21R is selected if the control signal SEL_R is "1".

Figure 4:
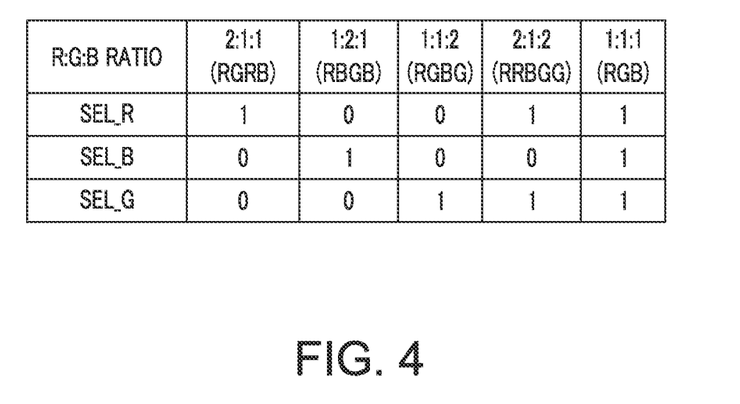
FIG. 4 is an illustrative diagram showing a table defining a control signal for each ratio of the numbers of R, G and B subpixels of the display panel.

The control signal SEL_R is for controlling the selector 22R based on the ratio of the numbers of R, G and B subpixels of the display panel to which the input signal correction device 10 is applied, and, here, "0" (extension) or "1" (degeneration) is determined by the ratio of the numbers of R, G and B subpixels, as shown in FIG. 4.

The extension/degeneration circuit 13B is configured to operate at operating frequency f and to receive input of a control signal SEL_B and, based on the control signal SEL_B, output a preprocessing signal BiA by extending the cycle length of an input signal Bi relating to B subpixels input from the input circuit 12 by a factor of 2 and or output a preprocessing signal BiA by degenerating the input signal Bi to ½.

Figure 3B:
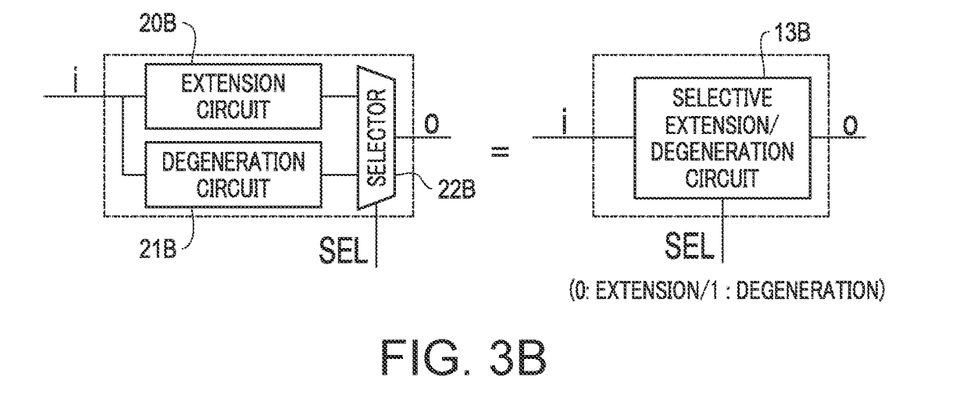
FIG. 3B is a block diagram showing the configuration of an extension/degeneration circuit for B subpixels.

In the extension/degeneration circuit 13B, as shown in FIG. 3B, an extension circuit 20B that outputs the preprocessing signal BiA by extending the cycle length of the input signal Bi by a factor of 2 and a degeneration circuit 21B that outputs the preprocessing signal BiA by degenerating the input signal Bi to ½ are connected to a selector 22B, and the extension circuit 20B is selected if the control signal SEL_B input to the selector 22B is "0", and the degeneration circuit 21B is selected if the control signal SEL_B is "1".

The control signal SEL_B is for controlling the selector 22B based on the ratio of the numbers of R, G and B subpixels of the display panel to which the input signal correction device 10 is applied, and "0" (extension) or "1" (degeneration) is determined by the ratio of the numbers of R, G and B subpixels (see FIG. 4).

The extension/degeneration circuit 13G is configured to operate at operating frequency f and to receive input of a control signal SEL_G and, based on the control signal SEL_G, output a preprocessing signal GiA by extending the cycle length of an input signal Gi relating to G subpixels input from the input circuit 12 by a factor of 2 or output a preprocessing signal GIA by degenerating the input signal Gi to ½.

Figure 3C:
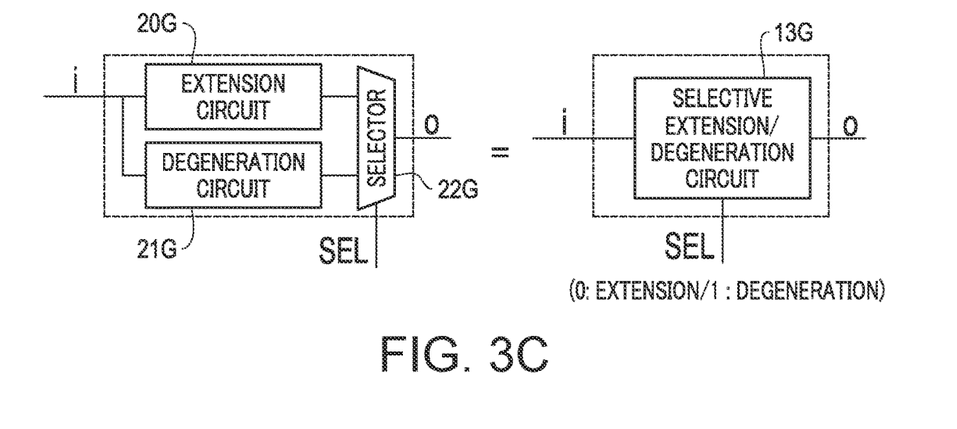
FIG. 3C is a block diagram showing the configuration of an extension/degeneration circuit for G subpixels of the input signal correction device of FIG. 1.

In the extension/degeneration circuit 13G, as shown in FIG. 3C, an extension circuit 20G that outputs the preprocessing signal GiA by extending the cycle length of the input signal Gi by a factor of 2 and a degeneration circuit 21G that outputs the preprocessing signal GiA by degenerating the input signal Gi to ½ are connected to a selector 22G, and the extension circuit 20G is selected if the control signal SEL_G input to the selector 22G is "0", and the degeneration circuit 21G is selected if the control signal SEL_G is "1".

The control signal SEL_G is for controlling the selector 22G based on the ratio of the numbers of R, G and B subpixels of the display panel to which the input signal correction device 10 is applied, and "0" (extension) or "1" (degeneration) is determined by the ratio of the numbers of R, G and B subpixels.

In the case of the display panel 11 having an RGBG pixel structure, the extension circuit 20R is selected by the selector 22R due to the control signal SEL_R being "0", the extension circuit 20B is selected by the selector 22B due to the control signal SEL_B being "0", and the degeneration circuit 21G is selected by the selector 22G due to the control signal SEL_G being "1".

Figure 5:
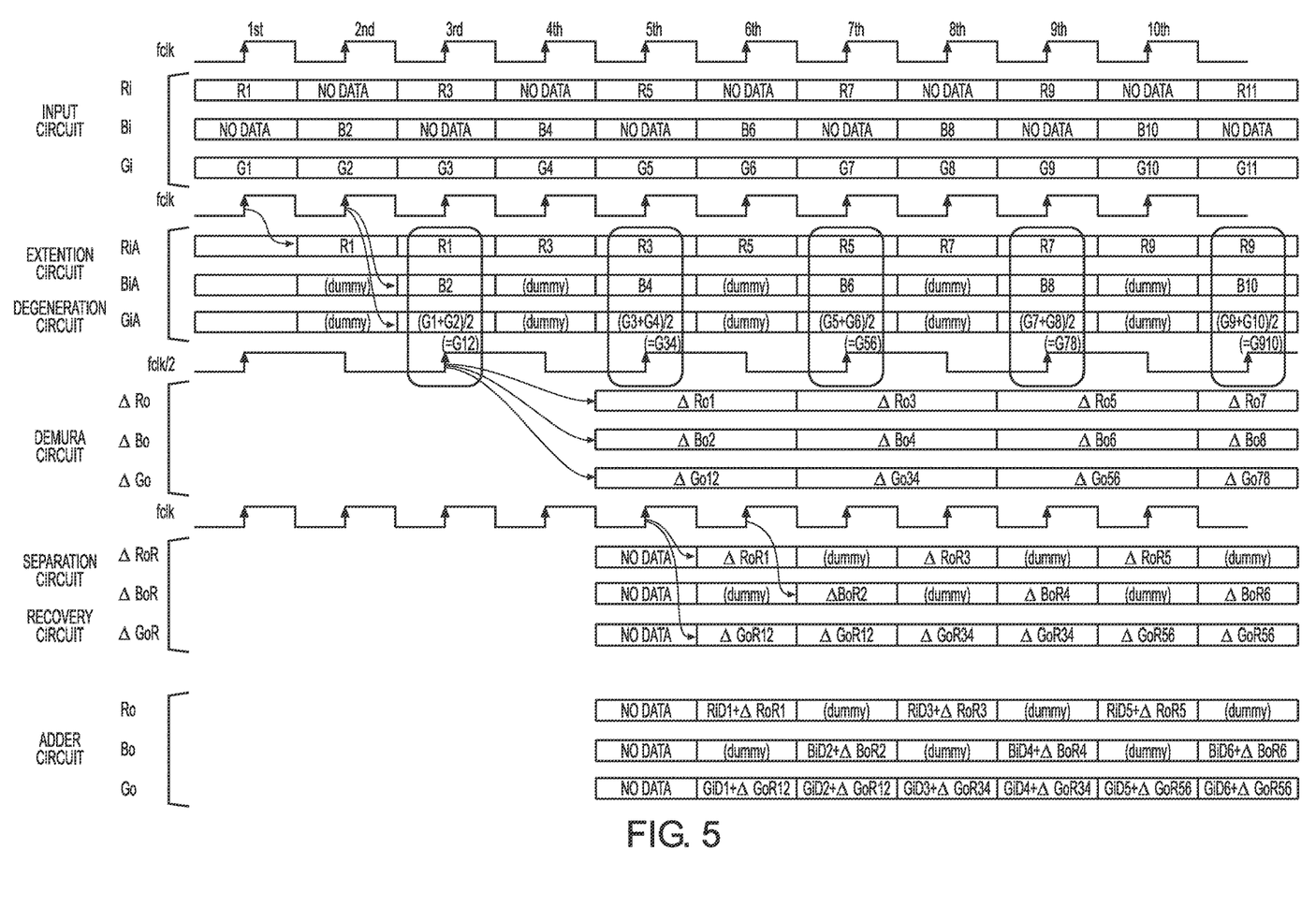
FIG. 5 is an illustrative diagram showing outputs of an input circuit, an extension/degeneration circuit, a demura circuit, a separation/recovery circuit and an adder circuit of the input signal correction device in FIG. 1.

Then, as shown in FIG. 5, when a signal R1 relating to the R subpixel $P_{1R}$ of the 1st pixel $P_1$ is input to the extension circuit 20R of the extension/degeneration circuit 13R in a first cycle, and a signal relating to an R subpixel of the 2nd pixel $P_2$ is not input to the extension circuit 20R in a second cycle because such a signal does not exist, the preprocessing signal RiA obtained by extending the signal R1 of the first cycle to two cycles is generated in the extension circuit 20R and output from the extension/degeneration circuit 13R.

A signal B2 relating to the B subpixel $P_{2B}$ of the 2nd pixel $P_2$ is input to the extension circuit 20B of the extension/degeneration circuit 13B in a second cycle, and the preprocessing signal BiA obtained by adding a dummy signal that has no data in a first cycle to the input signal B2 is generated in the extension circuit 20B and output from the extension/degeneration circuit 13B.

A signal G1 relating to the G subpixel $P_{1G}$ of the 1st pixel $P_1$ is input to the degeneration circuit 21G of the extension/degeneration circuit 13G in a first cycle and a signal G2 relating to the G subpixel $P_{2G}$ of the 2nd pixel $P_2$ is input to the degeneration circuit 21G in a second cycle, and the preprocessing signal GiA obtained by assigning a signal (G1+G2)/2 obtained by taking the arithmetic mean of the signal G1 and the signal G2 to the second cycle and adding a dummy signal in the first cycle is generated in the degeneration circuit 21G and output from the extension/degeneration circuit 13G.

The demura circuit 14 is configured to operate at operating frequency f/2 and to correct the preprocessing signals RiA, BiA and GiA and respectively output correction signals ΔRo, ΔBo and ΔGo for the R, G and B subpixels. That is, the signals R1, B2 and (G1+G2)/2, which are the second cycle of the preprocessing signals RiA, BiA and GiA, are input to the demura circuit 15, and signals ΔRo1, ΔBo2 and ΔGo, are generated in the demura circuit 14 as the correction signals ΔRo, ΔBo and ΔGo, by correcting the signals R1, B2 and (G1+G2)/2 based on correction data stored in the demura circuit 15. At this time, the operating frequency of the demura circuit 15 is f/2, and thus the signal lengths of the correction signals ΔRo1, ΔBo2, and ΔGo12 will be doubled (equivalent to two cycles).

The separation/recovery circuit 15R is configured to operate at operating frequency f and to receive input of a control signal SEL_R and, based on the control signal SEL_R, output a differential signal ΔroR by reducing the cycle length of the correction signal ΔRo relating to R subpixels to ½ or reduce the cycle length of the correction signal ΔRo to ½ and output the same differential signal ΔRoR over two cycles.

Figure 6A:
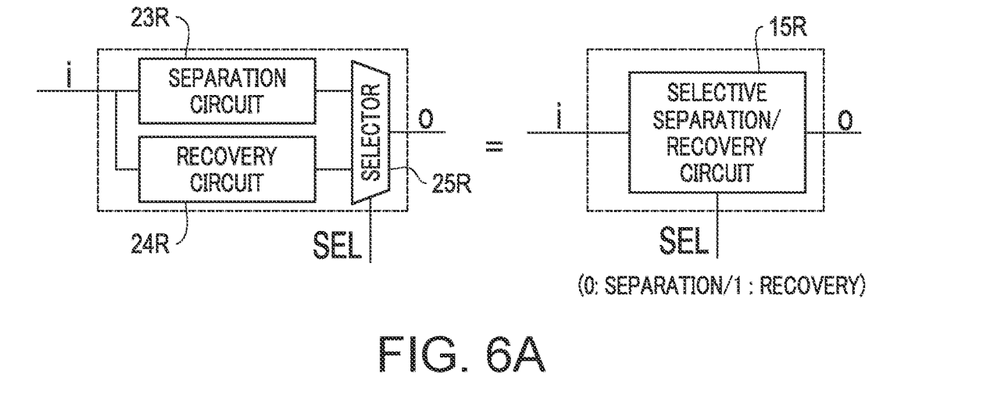
FIG. 6A is a block diagram showing the configuration of a separation/recovery circuit for R subpixels.

In the separation/recovery circuit 15R, as shown in FIG. 6A, a separation circuit 23R that outputs the differential signal ΔRoR by reducing the cycle length of the correction signal ΔRo to ½ and a recovery circuit 24R that reduces the cycle length of the correction signal ΔRo to ½ and outputs the same differential signal ΔRoR over two cycles are connected to a selector 25R, and the separation circuit 23R is selected if the control signal SEL_R input to the selector 25R is "0" and the recovery circuit 24R is selected if the control signal SEL_R is "1".

The control signal SEL_R is for controlling the selector 25R based on the ratio of the numbers of R, G and B subpixels of the display panel to which the input signal correction device 10 is applied, and, here, is the same as the control signal that is input to the extension/degeneration circuit 13R.

The separation/recovery circuit 15B is configured to operate at operating frequency f and to receive input of a control signal SEL_B, and, based on the control signal SEL_B, output a differential signal ΔBoR by reducing the cycle length of the correction signal ΔBo relating to B subpixels to ½ or reduce the cycle length of the correction signal ΔBo to ½ and output the same differential signal ΔBoR over two cycles.

Figure 6B:
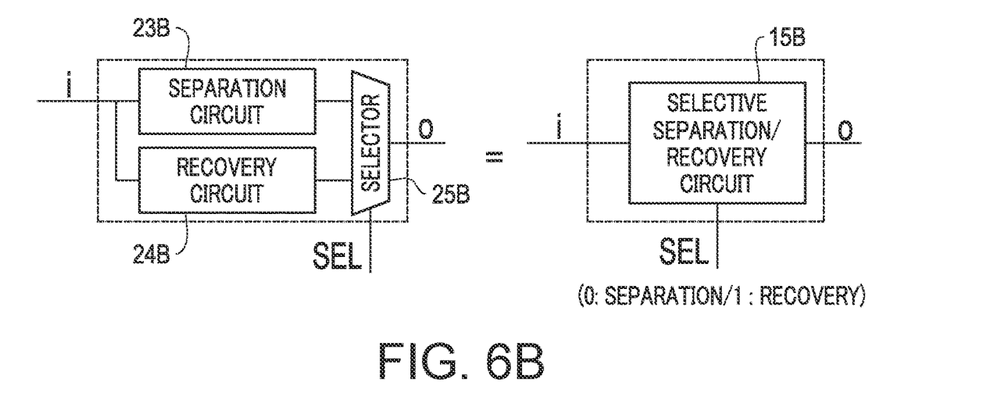
FIG. 6B is a block diagram showing the configuration of a separation/recovery circuit for B subpixels.

In the separation/recovery circuit 15B, as shown in FIG. 6B, a separation circuit 23B that outputs the differential signal ΔBoR by reducing the cycle length of the correction signal ΔBo to ½ and a recovery circuit 24B that reduces the cycle length of the correction signal ΔBo to ½ and outputs the same differential signal ΔBoR over two cycles are connected to a selector 25B, and the separation circuit 23B is selected if the control signal SEL_B input to the selector 25B is "0" and the recovery circuit 24B is selected if the control signal SEL_B is "1".

The control signal SEL_B is for controlling the selector 25B based on the ratio of the numbers of R, G and B subpixels of the display panel to which the input signal correction device 10 is applied, and, here, is the same as the control signal that is input to the extension/degeneration circuit 13B.

The separation/recovery circuit 15G is configured to operate at operating frequency f and to receive input of a control signal SEL_G, and, based on the control signal SEL_G, output a differential signal ΔGoR by reducing the cycle length of the correction signal ΔGo relating to G subpixels to ½ or reduce the cycle length of the correction signal ΔGo to ½ and output the same differential signal ΔGoR over two cycles.

Figure 6C:
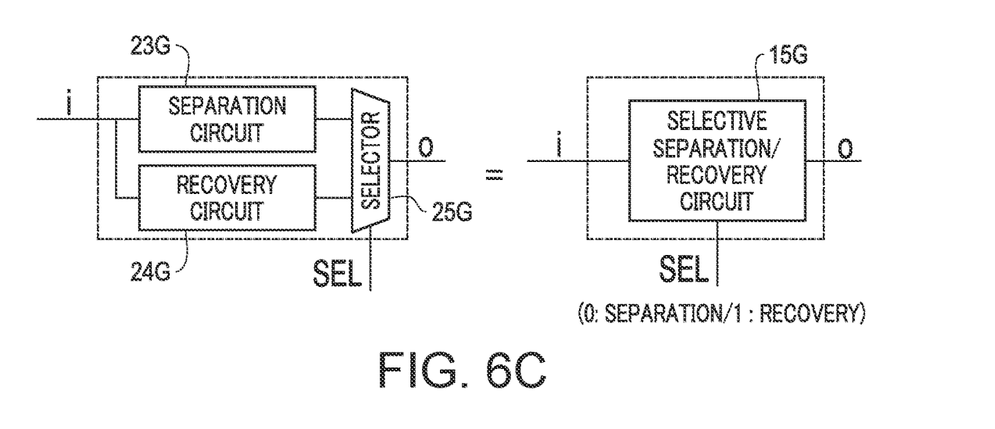
FIG. 6C is a block diagram showing the configuration of a separation/recovery circuit for G subpixels of the input signal correction device of FIG. 1.

In the separation/recovery circuit 15G, as shown in FIG. 6C, a separation circuit 23G that outputs the differential signal ΔGoR by reducing the cycle length of the correction signal ΔGo to ½ and a recovery circuit 24G that reduces the cycle length of the correction signal ΔGo to ½ and outputs the same differential signal ΔGoR over two cycles are connected to a selector 25G, and the separation circuit 23G is selected if the control signal SEL_G input to the selector 25G is "0" and the recovery circuit 24G is selected if the control signal SEL_G is "1".

The control signal SEL_G is for controlling the selector 25G based on the ratio of the numbers of R, G and B subpixels of the display panel to which the input signal correction device 10 is applied, and, here, is the same as the control signal that is input to the extension/degeneration circuit 13G.

In the case of the display panel 11 having an RGBG pixel structure, the separation circuit 23R is selected by the selector 25R due to the control signal SEL_R being "0", and the separation circuit 23B is selected by the selector 25B due to the control signal SEL_B being "0", and the recovery circuit 24G is selected by the selector 25G due to the control signal SEL_G being "1".

Then, when the signal ΔRo1 is input as the correction signal ΔRo to the separation circuit 23R of the separation/recovery circuit 15R in the first cycle, a signal ΔRoR1 obtained by adding a dummy signal in the second cycle to the signal ΔRo1 and separating the signal ΔRo1 in the first cycle is generated in the separation circuit 23R and output from the separation/recovery circuit 15R (see FIG. 5).

The signal ΔBo2 is input as the correction signal ΔBo to the separation circuit 23B of the separation/recovery circuit 15B in the second cycle, and a signal ΔBoR2 obtained by adding a dummy signal in the first cycle to the signal ΔBo2 and separating the signal ΔBo2 in the second cycle is generated in the separation circuit 23B and output from the separation/recovery circuit 15B.

The signal ΔGo12 is input as the correction signal ΔGo to the recovery circuit 24G of the separation/recovery circuit 15G in the first cycle, and, in the recovery circuit 24G, the signal ΔGo12 is also copied to the second cycle and recovered in two cycles (signal relating to G subpixel $P_{1G}$ of 1st pixel $P_1$ and signal relating to G subpixel $P_{2G}$ of 2nd pixel $P_2$) similarly to the input signal Gi, and a signal ΔGoR12 is generated and output from the separation/recovery circuit 15G.

The delay adjustment circuit 16 is configured to operate at operating frequency f and to delay the input signals Ri, Bi and Gi and respectively output delay signals RiD, BiD and GiD for the R, G and B subpixels, and, in FIG. 5, in the delay adjustment circuit 16, when input of the signals R1, B1 and G1 is received, signals RiD1, BiD1 and GiD1 obtained by delaying the signals R1, B1 and G1 are generated.

The adder circuit 17 is configured to output output signals Ro, Bo and Go (Ro=RiD+ΔRoR, Bo=BiD+ΔBoR, Go=GiD+ΔGoR; note that differential signals ΔRoR, ΔBoR and ΔGoR may be positive or may be negative) by respectively adding the differential signals ΔRoR, ΔBoR and ΔGoR to the delay signals RiD, BiD and GiD, and, in FIG. 5, in the adder circuit 17, a signal Ro1 is generated by the signal ΔRo1 being added to a signal RiD1, a signal Bo2 is generated by the signal ΔBo2 being added to a signal BiD2, a signal Go1 is generated by the signal ΔGo12 being added to a signal GiD1, and a signal Go1 is generated by the signal ΔGo12 being added to a signal GiD2.

The clock circuit 18 generates a clock signal of operating frequency f to be input to the input circuit 12, the extension/degeneration circuits 13R, 13B and 13G, the separation/recovery circuits 15R, 15B and 15G, and the delay adjustment circuit 16, and the frequency divider circuit 19 generates a clock signal of operating frequency f/2 to be input to the demura circuit 14 by dividing the frequency of the clock signal of operating frequency f by 2.

The input signal correction device 10 according to the present embodiment includes an input circuit 12 configured to operate at operating frequency f and to receive input of input signals Ri, Bi and Gi for the R, G and B subpixels, the extension/degeneration circuit 13R configured to operate at operating frequency f and to receive input of a control signal SEL_R, and, for R subpixels, output the preprocessing signal RiA by increasing the cycle length of the input signal Ri by a factor of 2 or output the preprocessing signal RiA by degenerating the input signal Ri to ½, based on the control signal SEL_R, the extension/degeneration circuit 13B configured to operate at operating frequency f and to receive input of a control signal SEL_B, and, for B subpixels, output the preprocessing signal BiA by increasing the cycle length of the input signal Bi by a factor of 2 or output the preprocessing signal BiA by degenerating the input signal Bi to ½, based on the control signal SEL_B, the extension/degeneration circuit 13G configured to operate at operating frequency f and to receive input of a control signal SEL_G, and, for G subpixels, output the preprocessing signal GiA by increasing the cycle length of the input signal Gi by a factor of 2 or output the preprocessing signal GiA by degenerating the input signal Gi to ½, based on the control signal SEL_G, the demura circuit 14 configured to operate at operating frequency f/2 and, for R, G and B subpixels, to output the correction signals ΔRo, ΔBo and ΔGo by correcting the preprocessing signals RiA, BiA and GiA, the separation/recovery circuit 15R configured to operate at operating frequency f and to receive input of a control signal SEL_R, and, for R subpixels, output the differential signal ΔRoR by reducing the cycle length of the correction signal ΔRo to ½ or reduce the cycle length of the correction signal ΔRo to ½ and output the same differential signal ΔRoR over two cycles, based on the control signal SEL_R, the separation/recovery circuit 15B configured to operate at operating frequency f and to receive input of a control signal SEL_B, and, for B subpixels, output the differential signal ΔBoR by reducing the cycle length of the correction signal ΔBo to ½ or reduce the cycle length of the correction signal ΔBo to ½ and output the same differential signal ΔBoR over two cycles, based on the control signal SEL_B, the separation/recovery circuit 15G configured to operate at operating frequency f and to receive input of a control signal SEL_G, and, for G subpixels, to output the differential signal ΔGoR by reducing the cycle length of the correction signal ΔGo to ½ or reduce the cycle length of the correction signal ΔGo to ½ and output the same differential signal ΔGoR over two cycles, based on the control signal SEL_G, the delay adjustment circuit 16 configured to operate at operating frequency f and, for R, G and B subpixels, to output the delay signals RiD, BiD and GiD by delaying the input signals Ri, Bi and Gi, and the adder circuit 17 configured to, for R, G and B subpixels, output the output signals Ro, Bo and Go by respectively adding the differential signals ΔRoR, ΔBoR and ΔGoR to the delay signals RiD, BiD and GiD. Due to the input signals Ri, Bi and Gi being degenerated to ½ by any or all of the extension/degeneration circuits 13R, 13B and 13G, the operating frequency of the demura circuit 14 can be lowered to ½, and thus power consumption required in the demura process (mura correction) can be substantially halved.

Also, the extension/degeneration circuits 13R, 13B and 13G are able to select whether to function as an extension circuit or as a degeneration circuit depending on control signals, and the separation/recovery circuits 15R, 15B and 15G are able to select whether to function as a separation circuit or as a recovery circuit depending on control signals, and thus by changing the control signals for each display panel (e.g., by selecting the extension circuit and the separation circuit for subpixels that are fewer in number and selecting the degeneration circuit and the recovery circuit for subpixel that are larger in number, out of the R, G and B subpixels), the input signal correction device 10 is compatible with a variety of display panels, and this also leads to a significant reduction in the development cost of semiconductor circuits.

Figure 7:
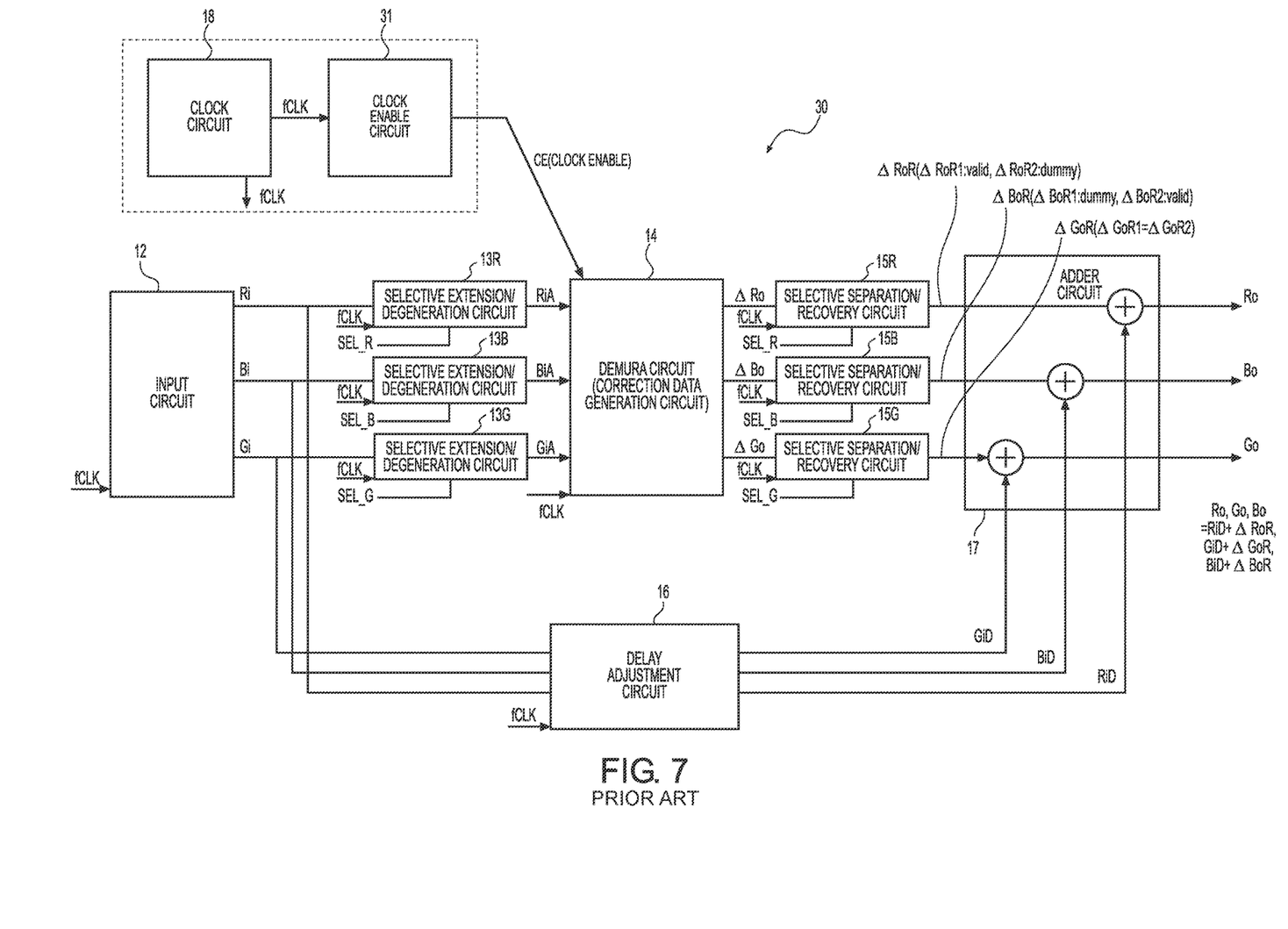
FIG. 7 is a block diagram showing another input signal correction device according to an embodiment of the invention.

FIG. 7 shows another input signal correction device according to the present embodiment. This input signal correction device 30 superposes a signal obtained by inverting the polarity of a mura signal acquired in advance on an input image signal and cancels mura defects of the panel body in the display panel 11, and, apart from the operations of the demura circuit 14 being different from the input signal correction device 10 and a clock enable circuit 31 being provided instead of the frequency divider circuit 19, has a similar configuration to the input signal correction device 10.

In the input signal correction device 30, the clock enable circuit 31 generates a clock enable signal for switching between enabling and disabling the clock signal at frequency f/N, based on the clock signal of frequency f generated by the clock circuit 18, and outputs this clock enable signal to the demura circuit 14.

Figure 8:
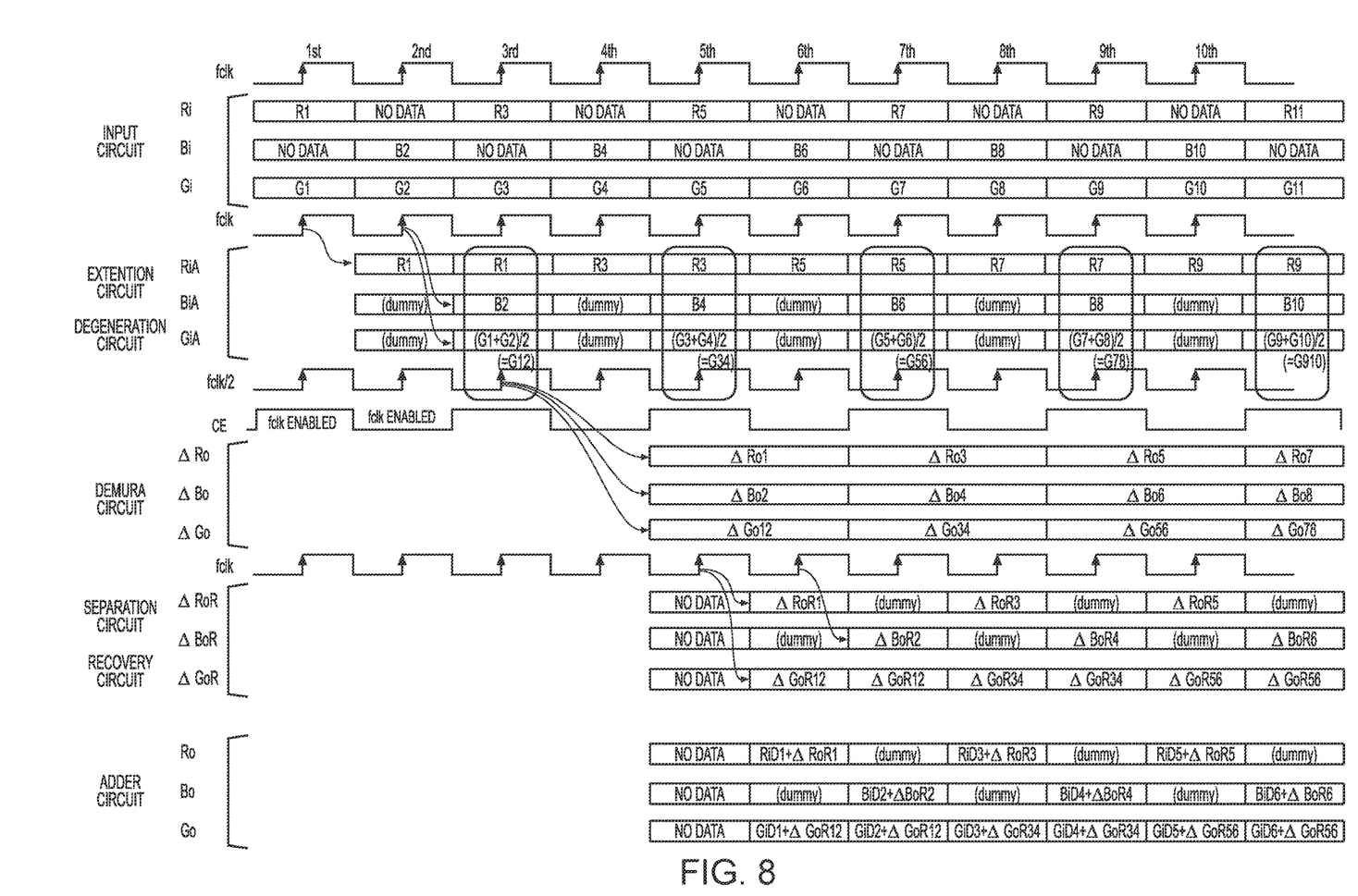
FIG. 8 is an illustrative diagram showing outputs of an input circuit, an extension/degeneration circuit, a demura circuit, a separation/recovery circuit, and an adder circuit of the input signal correction device in FIG. 7.

The demura circuit 14, as shown in FIG. 8, is configured to operate based on the clock signal of frequency f generated by the clock circuit 18, and to receive input of the clock enable signal generated by the clock enable circuit 31, and, similarly to the case of the input signal correction device 10, the signals R1, B2 and (G1+G2)/2, which are the second cycle of the preprocessing signals RiA, BiA and GiA, are input to the demura circuit 14 at the timing at which the clock enable signal is High (at this time, the clock signal is enabled, and when the clock enable signal is Low, the clock signal is disabled). In the demura circuit 14, the signals ΔRo1, ΔBo2 and ΔGo12 are generated as the correction signals ΔRo, ΔBo and ΔGo, by correcting the signals R1, B2 and (G1+G2)/2 based on correction data stored in the demura circuit 14.

This input signal correction device 30 includes the input circuit 12 configured to operate based on the clock signal of frequency f, and to receive input of the input signals Ri, Bi and Gi for the R, G and B subpixels, the extension/degeneration circuit 13R configured to operate based on the clock signal of frequency f and to receive input of a control signal SEL_R, and, for R subpixels, output the preprocessing signal RiA by increasing the cycle length of the input signal Ri by a factor of 2 or output the preprocessing signal RiA by degenerating the input signal Ri to ½, based on the control signal SEL_R, the extension/degeneration circuit 13B configured to operate based on the clock signal of frequency f and to receive input of a control signal SEL_B, and, for B subpixels, output the preprocessing signal BiA by increasing the cycle length of the input signal Bi by a factor of 2 or output the preprocessing signal BiA by degenerating the input signal Bi to ½, based on the control signal SEL_B, the extension/degeneration circuit 13G configured to operate based on the clock signal of frequency f and to receive input of a control signal SEL_G, and, for G subpixels, output the preprocessing signal GiA by increasing the cycle length of the input signal Gi by a factor of 2 or output the preprocessing signal GiA by degenerating the input signal Gi to ½, based on the control signal SEL_G, the demura circuit 14 configured to operate based on the clock signal of frequency f and to receive input of the clock enable signal for switching between enabling and disabling the clock signal at frequency f/2, and output the correction signals ΔRo, ΔBo and ΔGo by correcting the preprocessing signals RiA, BiA and GiA, the separation/recovery circuit 15R configured to operate based on the clock signal of frequency f and to receive input of a control signal SEL_R, and, for R subpixels, output the differential signal ΔRoR by reducing the cycle length of the correction signal ΔRo to ½ or reduce the cycle length of the correction signal ΔRo to ½ and output the same differential signal ΔRoR over two cycles, based on the control signal SEL_R, the separation/recovery circuit 15B configured to operate based on the clock signal of frequency f and to receive input of a control signal SEL_B, and, for B subpixels, output the differential signal ΔBoR by reducing the cycle length of the correction signal ΔBo to ½ or reduce the cycle length of the correction signal ΔBo to ½ and output the same differential signal ΔBoR over two cycles, based on the control signal SEL_B, the separation/recovery circuit 15G configured to operate based on the clock signal of frequency f and to receive input of a control signal SEL_G, and, for G subpixels, output the differential signal ΔGoR by reducing the cycle length of the correction signal ΔGo to ½ or reduce the cycle length of the correction signal ΔGo to ½ and output the same differential signal ΔGoR over two cycles, based on the control signal SEL_G, the delay adjustment circuit 16 configured to operate based on the clock signal of frequency f and, for R, G and B subpixels, to output the delay signals RiD, BiD and GiD by delaying the input signals Ri, Bi and Gi, and the adder circuit 17 configured to, for R, G and B subpixels, output the output signals Ro, Bo and Go by respectively adding the differential signals ΔRoR, ΔBoR and ΔGoR to the delay signals RiD, BiD and GiD. Due to the input signals Ri, Bi and Gi being degenerated to ½ by any or all of the extension/degeneration circuits 13R, 13B and 13G, and the clock enable signal being input to the demura circuit 14, the operating frequency of the demura circuit 14 can be made equivalent to the input signal correction device 10, and power consumption required in the demura process can be reduced.

Also, in the input signal correction device 30, the extension/degeneration circuits 13R, 13B and 13G are able to select whether to function as an extension circuit or as a degeneration circuit depending on control signals, and the separation/recovery circuits 15R, 15B and 15G are able to select whether to function as a separation circuit or as a recovery circuit depending on control signals, and thus the input signal correction device 30 is also compatible with a variety of display panels similarly to the input signal correction device 10.

Although embodiments of the present invention are illustrated above, the embodiments of the invention are not limited to those described above, and changes and the like can be made as appropriate within a scope that does not depart from the spirit of the invention.

For example, the panel body of the display panel to which the input signal correction device is applied is not limited to that having an RGBG pixel structure, and may have an RBGB pixel structure in which pixels including an R subpixel and a B subpixel and pixels including a G subpixel and a B subpixel are combined, an RBRG pixel structure in which pixels including a G subpixel and an R subpixel and pixels including a G subpixel and an R subpixel are combined, a pixel structure in which the numbers of R, G and B subpixels are equal, or a pixel structure including subpixels of colors other than R, G and B.

Also, in the case of a display panel in which the numbers of R, G and B subpixels are not equal, it is not essential to satisfy a ratio of minority subpixels to majority subpixels of 1:2, and, for example, a configuration may be adopted in which the ratio of minority subpixels to majority subpixels is 1:3, the extension/degeneration circuit degenerates the signal of the majority subpixels to ⅓ rather than ½, and the frequency divider circuit is a divide-by-3 frequency divider circuit rather than a divide-by-2 frequency divider circuit.

Furthermore, the control signal of the extension/degeneration circuit and the control signal of the separation/recovery circuit may be different control signals, another degeneration function such as weighted mean instead of arithmetic mean may be employed in the degeneration circuit, and correction of input signals is not limited to mura correction, and the input signal correction device according to the present invention may perform any manner of correction.

LIST OF REFERENCE NUMERALS

10 Input signal correction device
11 Display panel
12 Input circuit
13R Extension/degeneration circuit
13B Extension/degeneration circuit
13G Extension/degeneration circuit
14 Demura circuit (correction circuit)
15R Separation/recovery circuit
15B Separation/recovery circuit
15G Separation/recovery circuit
16 Delay adjustment circuit
17 Adder circuit
18 Clock circuit
19 Frequency divider circuit
20R Extension circuit
20B Extension circuit
20G Extension circuit
21R Degeneration circuit
21B Degeneration circuit
21G Degeneration circuit
23R Separation circuit
23B Separation circuit
23G Separation circuit
24R Recovery circuit
24B Recovery circuit
24G Recovery circuit
30 Input signal correction device
31 Clock enable circuit

The invention claimed is:

1. An input signal correction device for correcting input signals for a display panel in which numbers of R, G and B subpixels are equal or unequal at a ratio of minority subpixels to majority subpixels of 1:N, where N is an integer of 2 or more, comprising:
   an input circuit configured to operate at operating frequency f, and for each of the R, G and B subpixels, to receive input of an input signal;
   an extension/degeneration circuit configured to operate at operating frequency f and to receive input of a first control signal and, for each of the R, G and B subpixels, output a preprocessing signal by increasing a cycle length of the input signal by a factor of N or output a preprocessing signal by degenerating the input signal to 1/N, based on the first control signal;
   a correction circuit configured to operate at operating frequency f/N and, for each of the R, G and B subpixels, to output a correction signal by correcting the preprocessing signal;
   a separation/recovery circuit configured to operate at operating frequency f and to receive input of a second control signal and, for each of the R, G and B subpixels, output a differential signal by reducing the cycle length of the correction signal to 1/N or reduce the cycle length of the correction signal to 1/N and output a same differential signal over N cycles, based on the second control signal;
   a delay adjustment circuit configured to operate at operating frequency f, and for each of the R, G and B subpixels, to output a delay signal by delaying the input signal; and
   an adder circuit configured to, for each of the R, G and B subpixels, add the differential signal to the delay signal.

2. The input signal correction device according to claim 1, comprising:
   a clock circuit configured to generate a clock signal of operating frequency f to be input to the input circuit, the extension/degeneration circuit, the separation/recovery circuit, and the delay adjustment circuit; and a frequency divider circuit configured to generate a clock signal of operating frequency f/N to be input to the correction circuit, by dividing a frequency of the clock signal of operating frequency f.

3. The input signal correction device according to claim 2, wherein the correction circuit outputs the correction signal by correcting the preprocessing signal to reduce mura defects of the display panel.

4. The input signal correction device according to claim 1, wherein the correction circuit outputs the correction signal by correcting the preprocessing signal to reduce mura defects of the display panel.

5. An input signal correction device for correcting input signals for a display panel in which numbers of R, G and B subpixels are equal or unequal at a ratio of minority subpixels to majority subpixels of 1:N, where N is an integer of 2 or more, comprising:
- an input circuit configured to operate based on a clock signal of frequency f, and for each of the R, G and B subpixels, to receive input of an input signal;
- an extension/degeneration circuit configured to operate based on the clock signal and to receive input of a first control signal and, for each of the R, G and B subpixels, output a preprocessing signal by increasing a cycle length of the input signal by a factor of N or output a preprocessing signal by degenerating the input signal to 1/N, based on the first control signal;
- a correction circuit configured to operate based on the clock signal and to receive input of a clock enable signal for switching between enabling and disabling the clock signal at frequency f/N and, for each of the R, G and B subpixels, output a correction signal by correcting the preprocessing signal;
- a separation/recovery circuit configured to operate based on the clock signal and to receive input of a second control signal and, for each of the R, G and B subpixels, output a differential signal by reducing the cycle length of the correction signal to 1/N or reduce the cycle length of the correction signal to 1/N and output a same differential signal over N cycles, based on the second control signal;
- a delay adjustment circuit configured to operate based on the clock signal and, for each of the R, G and B subpixels, to output a delay signal by delaying the input signal; and
- an adder circuit configured to, for each of the R, G and B subpixels, add the differential signal to the delay signal.

6. The input signal correction device according to claim 5, comprising:
- a clock circuit configured to generate the clock signal; and
- a clock enable circuit configured to generate the clock enable signal based on the clock signal.

7. The input signal correction device according to claim 6, wherein the correction circuit outputs the correction signal by correcting the preprocessing signal to reduce mura defects of the display panel.

8. The input signal correction device according to claim 5, wherein the correction circuit outputs the correction signal by correcting the preprocessing signal to reduce mura defects of the display panel.

* * * * *